United States Patent [19]
Kreitzer

[11] Patent Number: 4,659,188
[45] Date of Patent: Apr. 21, 1987

[54] ZOOM LENS

[75] Inventor: Melvyn H. Kreitzer, Cincinnati, Ohio

[73] Assignee: Vivitar Corporation, Santa Monica, Calif.

[21] Appl. No.: 682,559

[22] Filed: Dec. 17, 1984

[51] Int. Cl.[4] .......................... G02B 9/64; G02B 15/14
[52] U.S. Cl. ........................................ 350/427; 350/432
[58] Field of Search .......................... 350/427, 432, 423

[56] References Cited

U.S. PATENT DOCUMENTS 4,256,381 3/1981 Kreitzer ............................... 350/423

FOREIGN PATENT DOCUMENTS

1043606 12/1978 Canada ................................ 350/432

Primary Examiner—John K. Corbin
Assistant Examiner—Rebecca D. Gass
Attorney, Agent, or Firm—Costas, Montgomery & Dorman

[57] ABSTRACT

A zoom lens having a range of equivalent focal lengths extending from a range below the dimension of the diagonal of the image frame to a dimension substantially above and having a zooming range of up to six to one or greater where the lens has a plus, minus, plus, plus lens unit configuration with a strongly negative second lens unit and a fourth lens unit designed to have a given power and telephoto ratio to compensate for a remote aperture stop located in the third lens unit.

15 Claims, 8 Drawing Figures

ZOOM LENS

FIELD OF THE INVENTION

This invention relates to zoom lenses and, more particularly, relates to zoom lenses having a range of equivalent focal lengths (EFL) from a dimension below the diagonal of the image frame to a long focal length which may be as great as six times the diagonal of the image plane.

BACKGROUND OF THE INVENTION

Wide angle to long focal length zoom lenses have been available for some time. However, there is a constant effort to design such lenses which are more compact, while having a relatively fast aperture. These wide angle to long focal length zoom lenses require different design considerations than a so-called telephoto zoom lens, which, in the thirty-five millimeter format, may be a 70-210 millimeter zoom lens, as exemplified in U.S. Pat. No. 3,817,600.

In the telephoto zoom lenses, it is customary that a rear stationary lens unit have a low telephoto ratio, generally less than one, and the aperture defining iris is included in this rear stationary lens unit. The telephoto ratio is the ratio of the equivalent focal length of the lens or lens lens unit to the front vertex distance (FVD), where the front vertex distance is the distance from the front apex of the lens to the image plane, generally when the lens if focused to infinity. An example of a widely used wide angle to long focal length zoom lens is disclosed in U.S. Pat. No. 4,299,454.

It is common practice to use a basic triplet or variation thereof as a rear lens unit in a zoom lens. The optical powers of a triplet are in a plus-minus-plus configuration separated by small air spaces. The lens units may be subdivided or compounded, but the overall shape remains biconvex. The positive lens units may be and often are meniscus shaped. A triplet, in its simplest form, can be corrected for all primary aberrations, and is particularly well suited for large aperture requirements; however, it is limited with respect to angular coverage because of inherent astigmatism.

In wide angle to long focal length zoom lenses, where the rear lens unit moves to vary the EFL, the iris defining aperture cannot be placed in the rear lens unit. Otherwise, the diameter of the front of the lens would become excessive.

The fourth lens unit thus has to operate with the handicap of having a removed aperture stop. Generally, in wide angle to long focal length zoom lenses utilizing four lens units, a compromise is made in that the aperture stop is positioned closely adjacent the third lens unit and may move with the third lens unit, as disclosed in U.S. Pat. No. 4,299,454, or may remain stationary with the third lens unit, as disclosed in U.S. Pat. No. 4,256,381. If the aperture stop is positioned too far away from the rear lens grouping, it becomes very difficult to control aberration correction without a complex rear lens unit, sacrificing compactness.

A major design constraint of the wide angle to long focal length zoom lens is the size of the rear lens opening. Typically, the clear aperture must be less than thirty millimeters (24×36 mm image size). In the wide angle position, light rays pass through the third lens unit at a large angle to the optical axis normally requiring large clear apertures of the elements of the fourth lens unit. If compactness of the lens is not emphasized, then the optical power of the fourth lens unit need not be large and the size of the opening of the fourth lens unit is not so critical. However, in the use of the thirty-five millimeter camera, lens compactness is a primary concern.

Accordingly, the present invention provides a four lens unit wide angle to long focal length zoom lens of plus, minus, plus, plus configuration, having a new and improved design in the fourth lens unit which compensates for the problem of a remote aperture stop, and diameter of the fourth lens unit, and which is relatively simple in a design that contributes to the compactness of the overall lens.

SUMMARY OF THE INVENTION

The present invention is directed to a wide angle to long focal length zoom lens of the types shown in U.S. Pat. Nos. 4,299,454 and 4,256,381. The aforementioned patents disclose wide angle to long focal length zoom lens comprising a first positive lens unit, a second very strong negative lens unit, a third positive lens unit, and a fourth positive lens unit. In commercial forms of these lenses, generally the first and fourth lens units move in the same direction for zooming, while the second lens unit moves in a direction opposite to the direction of movement of the first and fourth lens units. The third lens unit may move or may remain stationary. Alternatively, the second lens unit may be fixed and the third lens unit move in fixed relation to the aperture defining iris. A characteristic of this form of lens is its very strong negative second lens unit. This contributes to the compactness of the lens over a wide range of equivalent focal lengths (EFL) which may be greater than five to one. Typically, the second negative lens unit may have an absolute power which has a ratio to the geometric mean of the extremes of the EFL's of the lens as great as five to one.

The present invention provides zoom lenses which may have a zoom ratio of over six to one, using a four lens unit configuration of plus, minus, plus, plus configuration. The lens is arranged with the iris defining aperture positioned with the third lens unit in fixed relation thereto. The fourth lens unit comprises a first sub lens unit, which is a positive element followed by a doublet comprising a positive element and a negative element. The second sub lens unit may take various forms. However, it is important that the telephoto ratio of the fourth lens unit be within a given range, greater than unity, and the optical power of the lens be within a specified range, as hereinafter disclosed. The disclosed lens form is one in which the first and fourth lens units move in the same direction during zooming, and most often in fixed relation.

An object of this invention is to provide a new and improved zoom lens of the type described.

Another object of this invention is to provide a zoom lens of the type described having a new and improved fourth lens unit which contributes to compactness of the lens.

The features of the invention which are believed to be novel are particularly pointed out and distinctly claimed in the concluding portion of this specification. However, the invention, both as to its organization and operation, together with further objects and advantages thereof, may best be appreciated by reference to the following detailed description taken in conjunction with the drawings.

DETAILED DESCRIPTION OF PREFERRED EMBODIMENTS OF THE INVENTION

Lenses embodying the invention comprise four lens units, G1, G2, G3, and G4, as exemplified in all figures of the drawings. The lens units are referenced as G1-G4 from the object end to the image end.

Lens elements are identified by the reference L followed by an arabic numeral progressively from the object end to the image end of the lens.

Lens element surfaces are identified by the reference S followed by an arabic numeral progressively from the object end to the image end of the lens.

The focal plane of the lenses shown in the drawings are denoted by the reference FP and the optical axis by A. The prescriptions of all lenses set forth in the Tables II-IX are scaled to an image format of 24×36 mm.

In FIGS. 1-6, lens unit G1 comprises a biconvex doublet L1, either air spaced or cemented, L2, and a positive meniscus L3.

In FIGS. 1-6, the second lens unit G2 comprises a negative meniscus L4, a biconcave component L5, and a doublet comprising a positive element L6 concave to the object and a negative element L7. Lens having the configuration of this second negative lens unit are disclosed and claimed in U.S. Pat. No. 4,299,454, assigned to the same assignee as the present invention.

The third lens unit G3 in all cases is positioned in fixed relation to the aperture defining iris I. In FIGS. 1, 2, 4, and 6, lens unit G3 is a doublet comprising a biconvex element L8 and a meniscus L9 concave to the object In FIG. 3, lens unit G3 is a single element L8. In FIG. 4, lens unit G3 comprises a biconvex element L8, followed by a biconvex doublet L9, L10.

Figure 1:
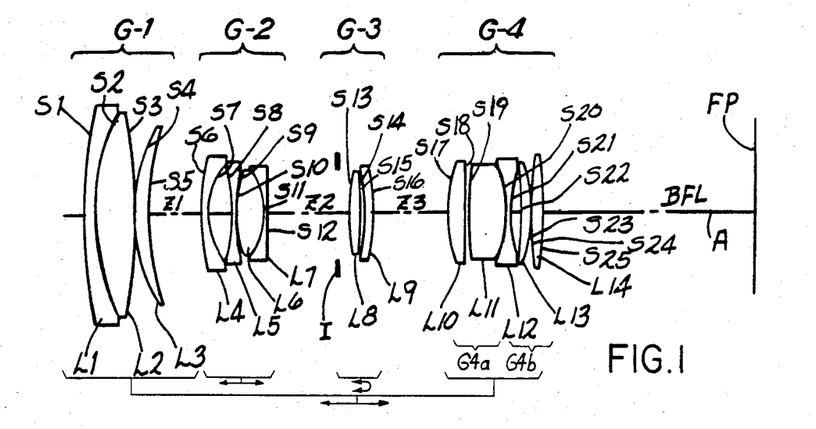
FIGS. 1-8 are schematic side elevations of lenses embodying the invention.

Lens unit G4 in all examples consist of first and second sub lens units, hereinafter designated in Table I as G4a and G4b, respectively. The first sub lens unit comprises a positive element L10 in FIGS. 1, 2, 4, and 6, L9 in FIG. 3, and L11 in FIG. 5. This positive component is followed by a doublet L11, L12 (FIGS. 1, 5, and 6), L12, L13 (FIG. 4), L10, L11 (FIGS. 2 and 3), either cemented or air spaced as shown in FIGS. 1 and 3, which comprises a positive element and a negative element.

Figure 4:
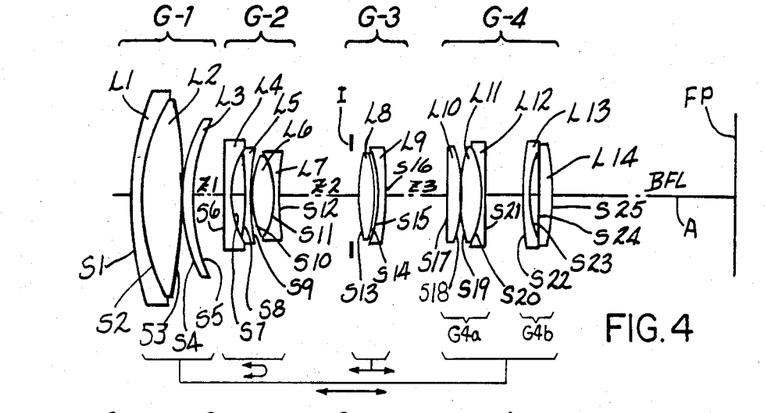
Figure 5:
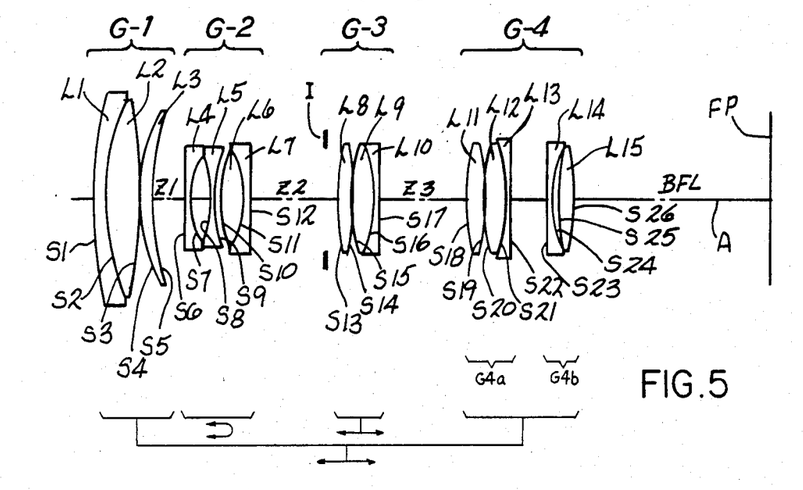

The second sub lens unit comprises two elements, L13, L14 (FIGS. 1, 2, 4, and 6), L12, L13 (FIG. 3), L15 (FIG. 5).

Figure 7:
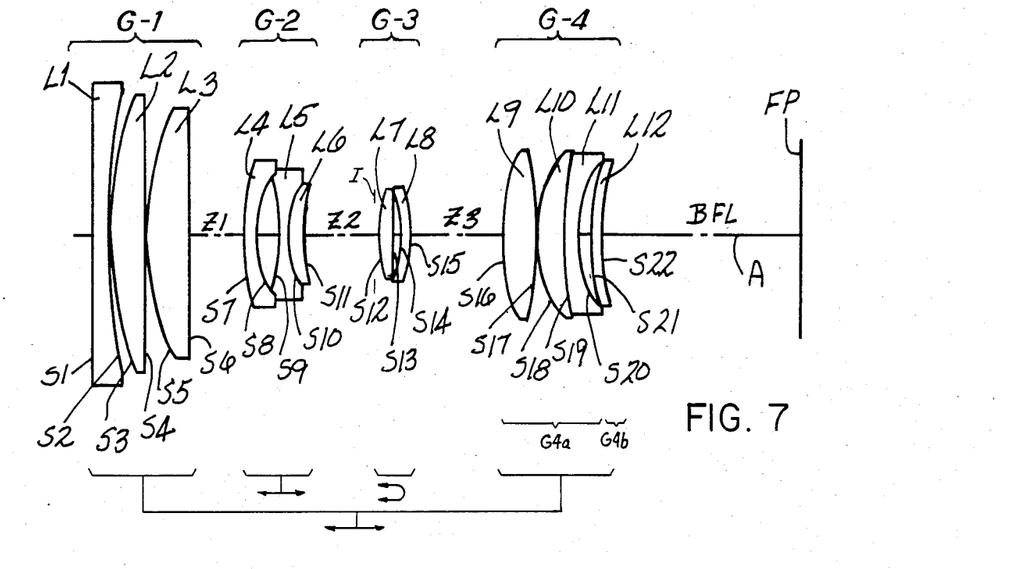

In FIG. 7, lens unit G1 comprises a biconcave element L1, followed by two biconcave elements L2 and L3. Lens unit G2 consists of a negative meniscus L4, convex to the object and a doublet comprising biconcave element L5 and a positive meniscus L6. Lens unit G3 comprises a positive element L7 convex to the object and a meniscus concave to the object. In lens unit G4 the first sub lens unit comprises a biconvex element L9 followed by a cemented doublet in the form of positive meniscus L11 convex to the object and a negative meniscus L11 also convex to the object. The second sub lens unit consists of a single meniscus L12 having an aspheric surface S21.

Figure 2:
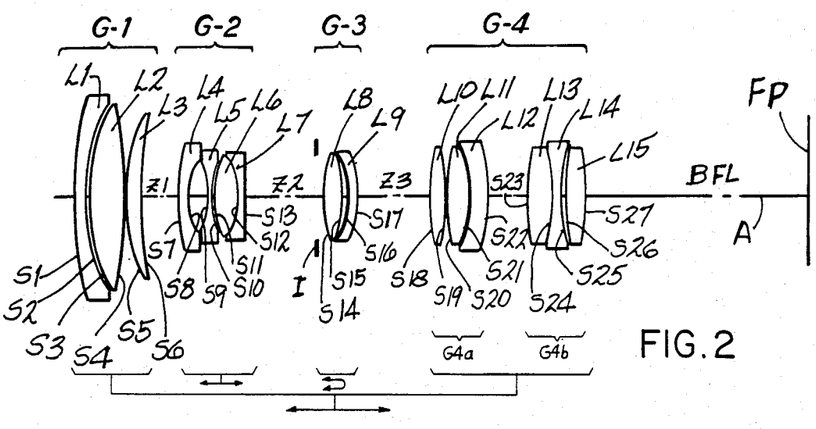
Figure 3:
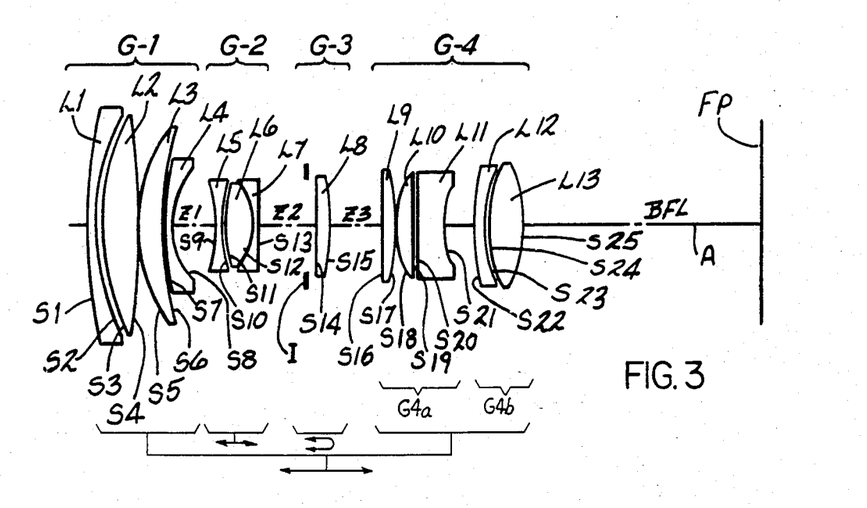
Figure 8:
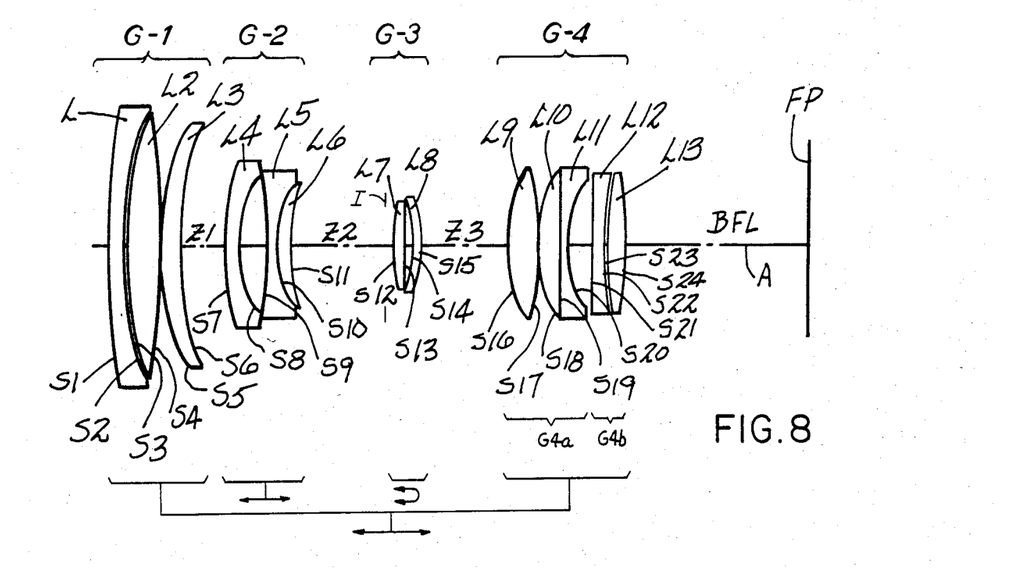

The lens of FIG. 8 has a front lens unit G1 comprising elements L1, L2 and L3 in a configuration the same as FIGS. 2 and 3. The second lens unit G2 comprises elements L4, L5 and L6 in the same configuration as FIG. 7. Lens unit G3 comprises elements L7 and L8 in the same configuration as FIG. 7. The first sub lens unit of lens unit G4 comrpises elements L9, L10 and L11 in the same configuration as FIG. 7 while the second sub lens unit consists of a biconcave element L12 and and biconvex element L13. The surface S22 of L12 is aspheric.

The lenses of FIGS. 7 and 8 include an element having at least one aspheric surface defined by the equation $$X = \frac{Cy^2}{1 + \sqrt{1 - (1 + K)C^2y^2}} + Dy^4 + Ey^6 + Fy^8 + Gy^{10}$$

where X is the surface sag at a semi-aperture distance Y from the axis A of the lens, C is the curvature of a lens surface of the optical axis A equal to the reciprocal of the radius of the optical axis, K is a conic constant.

The arrangement of the lens elements in lens units G1-G4 is tabulated and summarized in Table I. The subunits of lens unit G4 are denoted as G4a and G4b.

TABLE I

Figure 6:
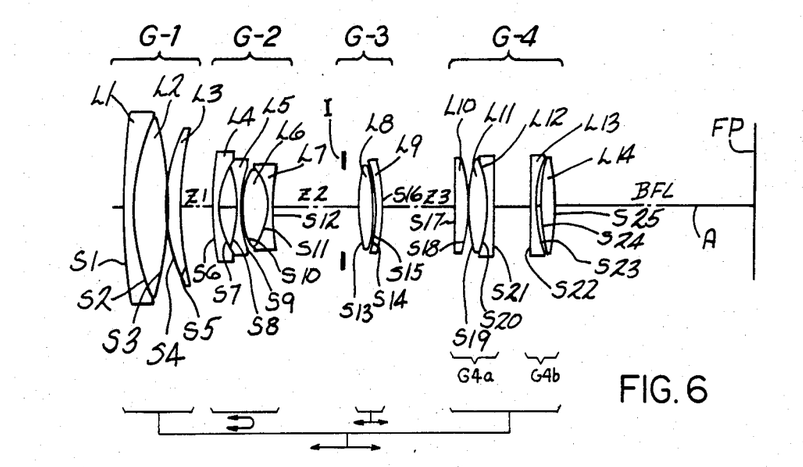

|  | G1 | G2 | G3 | G4a | G4b |
|---|---|---|---|---|---|
| FIG. 1 | L1-L3 | L4-L7 | L8,L9 | L10-L12 | L13,L14 |
| FIG. 2 | L1-L3 | L4-L7 | L8,L9 | L10-L12 | L13-L15 |
| FIG. 3 | L1-L3 | L4-L7 | L8 | L9-L11 | L12,L13 |
| FIG. 4 | L1-L3 | L4-L7 | L8,L9 | L10-L12 | L13,L14 |
| FIG. 5 | L1-L3 | L4-L7 | L8-L10 | L11-L13 | L14,L15 |
| FIG. 6 | L1-L3 | L4-L7 | L8,L9 | L10-L12 | L13,L14 |
| FIG. 7 | L1-L3 | L4-L6 | L7,L8 | L9-L11 | L12 |
| FIG. 8 | L1-L3 | L4-L6 | L7,L8 | L9-L11 | L12,L13 | where G4a and G4b are the front and rear subunits of lens unit G4 respectively.

Lens unit G4 has a telephoto ratio TR, where $$1.5 > TR > 1.0$$

The telephoto ratio TR is the ratio of the front vertex distance (FVD) of lens unit G4 to its equivalent focal length. The FVD is the dimension from the front apex of lens unit G4 to the focal plane FP when focused to infinity.

The ratio of the optical power $K_4$ of lens unit G4 to the geometric mean of the power of the overall lens $K_M$ is $$1.7 > K_4/K_M > 1.1$$

Additionally, the optical power $K_2$ of the second lens unit is very strong, and $$5.0 > |K_2/K_M| > 1.9$$

The geometric mean of the power of a zoom lens $(K_M)$ is $$\sqrt{K_S K_L}$$

where $K_S$ is the optical power of the lens expressed as the reciprocal of the shortest EFL in millimeters and $K_L$ is the optical power of the lens expressed as the reciprocal of the largest EFL in millimeters.

The various lenses disclosed herein may have different movements of the various lens units as hereinafter described. In the tables hereinafter set forth to describe the various lenses, the back focal length (BFL) is the distance from the rear apex of lens unit G4 at the optical axis to the film plane FP. The spacings between the various lens units Z1, Z2, and Z3 are as noted on the drawings and corresponding tables for various focal lengths.

A lens as shown in FIG. 1 is substantially described in Table II. In this lens lens unit G1 and G4 move in fixed relation. Lens unit G2 moves in a direction opposite to lens units G1 and G4, while lens unit G3 has reciprocating motion.

A lens as shown in FIG. 2 is substantially described in Table III. In this lens lens units G1 and G4 move in fixed relation. Group G2 is stationary, and lens unit G3 moves as noted in Table III.

The lens of FIG. 3 is substantially described in Table IV. Lens units G1 and G4 move in fixed relation. Lens unit G3 and iris I are stationary while lens unit G2 moves.

A lens as shown in FIG. 4 is substantially described in Table V. Here the first lens unit G1 and the fourth lens unit G4 move in fixed relation, lens unit G2 moves in the opposite direction and lens unit G3 moves as indicated.

FIG. 5 shows a lens as substantially described in Table VI. Here the first and fourth lens units, G1 and G4 move in the same direction but not in fixed relation. Both of lens units G2 and G3 also move. The iris I moves in fixed relation to lens unit G3.

FIG. 6 shows a lens as substantially described in Table VII. Here the first lens unit G1 and fourth lens unit G4 move in fixed relation, while both lens units G2 and G3 also move as noted in Table VII.

FIG. 7 shows a lens as substantially described in Table VIII. Here the first lens unit G1 and fourth lens unit G4 move in fixed relation. The second lens unit G2 and third lens unit G3 also move as noted in Table VIII. Here surfaces S5 and S22 are aspheric.

FIG. 8 shows a lens as substantially described in Table IX. Here the first lens unit G1 and fourth lens unit G4 move in fixed relation and lens units G2 and G3 move as noted in Table IX. Here surface S22 is aspheric. The aspheric surfaces are provided for purposes of optical correction.

FIG. 1 also exemplifies a lens as described in Table X with minor differences. In Table X, elements L1 and L2 are slightly air spaced and element L13 is of negative power. The lens of Table X has an aspheric surface S24.

TABLE II

| LENS | | SURFACE RADII(mm) | AXIAL DISTANCE BETWEEN SURFACES(mm) | $N_d$ | $V_d$ |
|---|---|---|---|---|---|
| L1 | S1 | 160.690 | | | |
| | | | 2.500 | 1.805 | 25.5 |
| L2 | S2 | 56.190 | | | |
| | | | 10.270 | 1.517 | 64.2 |
| | S3 | −144.312 | | | |
| | | | 0.200 | | |
| L3 | S4 | 40.250 | | | |
| | | | 4.100 | 1.806 | 40.7 |
| | S5 | 69.987 | | | |
| | | | Z1 | | |
| L4 | S6 | 61.000 | | | |
| | | | 1.500 | 1.806 | 40.7 |
| | S7 | 15.180 | | | |
| | | | 5.180 | | |
| L5 | S8 | −40.000 | | | |
| | | | 1.400 | 1.773 | 49.6 |
| | S9 | 49.500 | | | |
| | | | 0.200 | | |
| L6 | S10 | 28.000 | | | |
| | | | 7.200 | 1.673 | 32.2 |
| L7 | S11 | −15.415 | | | |
| | | | 1.200 | 1.773 | 49.6 |
| | S12 | −619.000 | | | |
| | | | Z2 | | |
| | Aperture | | | | |
| | | | 1.500 | | |
| L8 | S13 | 63.588 | | | |
| | | | 3.530 | 1.697 | 48.5 |
| | S14 | −42.087 | | | |
| | | | 0.480 | | |
| L9 | S15 | −30.682 | | | |
| | | | 1.650 | 1.806 | 40.7 |
| | S16 | −64.500 | | | |
| | | | Z3 | | |
| L10 | S17 | 34.420 | | | |
| | | | 4.630 | 1.581 | 40.9 |
| | S18 | −156.800 | | | |
| | | | 0.200 | | |
| L11 | S19 | 114.940 | | | |
| | | | 9.390 | 1.517 | 52.2 |
| | S20 | −31.690 | | | |
| L12 | | | 1.220 | 1.805 | 25.5 |
| | S21 | 34.420 | | | |
| | | | 2.480 | | |
| L13 | S22 | −88.000 | | | |
| | | | 2.400 | 1.806 | 40.7 |
| | S23 | −38.900 | | | |
| | | | 0.200 | | |
| L14 | S24 | 104.500 | | | |
| | | | 2.860 | 1.806 | 40.7 |
| | S25 | −140.000 | | | |

| ZOOM SPACING DATA | | | | | |
|---|---|---|---|---|---|
| EFL | Z1 | Z2 | Z3 | BFL | FVD |
| 28.83 mm | 1.00 mm | 19.33 mm | 16.61 mm | 56.93 mm | 158.16 mm |
| 50.01 | 14.92 | 11.77 | 10.25 | 68.19 | 169.41 |
| 5.01 | 26.31 | 6.24 | 4.38 | 78.01 | 179.24 |
| 131.00 | 34.52 | 1.51 | 0.91 | 83.26 | 184.48 |

TABLE III

| LENS | | SURFACE RADII(mm) | AXIAL DISTANCE BETWEEN SURFACES(mm) | $N_d$ | $V_d$ |
|---|---|---|---|---|---|
| L1 | S1 | 102.879 | | | |
| | | | 2.300 | 1.741 | 27.8 |
| | S2 | 48.694 | | | |
| | | | 0.500 | | |
| L2 | S3 | 48.183 | | | |
| | | | 10.400 | 1.514 | 64.2 |
| | S4 | −189.534 | | | |
| | | | 0.100 | | |
| L3 | S5 | 43.872 | | | |
| | | | 4.000 | 1.541 | 47.2 |
| | S6 | 75.339 | | | |
| | | | Z1 | | |
| L4 | S7 | 84.254 | | | |
| | | | 1.660 | 1.834 | 37.3 |
| | S8 | 20.443 | | | |
| | | | 5.908 | | |
| L5 | S9 | −32.836 | | | |
| | | | 1.440 | 1.773 | 49.6 |
| | S10 | 57.306 | | | |
| | | | 0.220 | | |
| L6 | S11 | 43.367 | | | |
| | | | 7.200 | 1.717 | 29.5 |
| | S12 | −16.903 | | | |
| L7 | | | 1.330 | 1.773 | 49.6 |
| | S13 | −333.557 | | | |
| | | | Z2 | | |
| L8 | S14 | 64.932 | | | |
| | | | 5.000 | 1.604 | 60.2 |
| | S15 | −48.454 | | | |
| | | | 1.126 | | |
| L9 | S16 | −29.934 | | | |
| | | | 2.000 | 1.673 | 32.2 |
| | S17 | −47.916 | | | |
| | | | 0.500 | | |
| | Aperture | | | | |
| | | | Z3 | | |

TABLE III-continued

| LENS | | SURFACE RADII(mm) | AXIAL DISTANCE BETWEEN SURFACES(mm) | $N_D$ | $V_D$ |
|---|---|---|---|---|---|
| L10 | S18 | 125.580 | 3.670 | 1.648 | 33.8 |
| | S19 | −68.714 | 0.180 | | |
| L11 | S20 | 88.886 | 6.000 | 1.517 | 64.2 |
| | S21 | −32.051 | | | |
| L12 | S22 | −83.481 | 5.500 | 1.785 | 25.7 |
| | | | 8.017 | | |
| L13 | S23 | 118.446 | 6.000 | 1.581 | 40.9 |
| | S24 | −42.226 | | | |
| L14 | S25 | 37.606 | 2.000 | 1.717 | 29.5 |
| | | | 1.900 | | |
| L15 | S26 | 341.397 | 4.800 | 1.805 | 25.5 |
| | S27 | −95.200 | | | |

ZOOM SPACING DATA

| EFL | Z1 | Z2 | Z3 | BFL | FVD |
|---|---|---|---|---|---|
| 38.50 mm | 7.00 mm | 19.19 mm | 23.74 mm | 48.36 mm | 186.24 mm |
| 73.00 | 22.36 | 10.63 | 13.68 | 66.89 | 201.50 |
| 136.00 | 36.30 | 4.64 | 5.02 | 81.83 | 215.74 |
| 194.06 | 42.86 | 0.59 | 1.06 | 89.52 | 221.97 |

TABLE IV

| LENS | | SURFACE RADII(mm) | AXIAL DISTANCE BETWEEN SURFACES(mm) | $N_d$ | $V_D$ |
|---|---|---|---|---|---|
| L1 | S1 | 97.471 | 2.000 | 1.805 | 25.5 |
| | S2 | 46.414 | 0.961 | | |
| L2 | S3 | 44.857 | 7.500 | 1.517 | 64.2 |
| | S4 | −204.325 | 0.100 | | |
| L3 | S5 | 33.332 | 5.000 | 1.658 | 50.9 |
| | S6 | 67.053 | Z1 | | |
| L4 | S7 | 48.154 | 1.400 | 1.834 | 37.3 |
| | S8 | 16.552 | 9.047 | | |
| L5 | S9 | −29.301 | 1.200 | 1.773 | 49.6 |
| | S10 | 37.735 | 0.200 | | |
| L6 | S11 | 30.244 | 5.800 | 1.673 | 32.2 |
| | S12 | −13.650 | | | |
| L7 | S13 | −101.590 | 1.200 | 1.773 | 49.6 |
| | | Aperture | Z2 | | |
| | | | 1.040 | | |
| L8 | S14 | 651.451 | 2.500 | 1.834 | 37.3 |
| | S15 | −75.022 | Z3 | | |
| L9 | S16 | 148.051 | 2.664 | 1.834 | 37.3 |
| | S17 | −59.655 | 0.100 | | |
| L10 | S18 | 17.272 | 3.600 | 1.517 | 64.2 |
| | S19 | 80.238 | 0.570 | | |
| L11 | S20 | −2295.605 | 6.060 | 1.785 | 26.1 |
| | S21 | 17.700 | 6.307 | | |
| L12 | S22 | 47.296 | 2.000 | 1.805 | 25.5 |
| | S23 | 28.126 | 0.931 | | |

TABLE IV-continued

| L13 | S24 | 29.714 | 6.000 | 1.517 | 64.2 |
|---|---|---|---|---|---|
| | S25 | −40.167 | | | |

ZOOM SPACING DATA

| EFL | Z1 | Z2 | Z3 | BFL | FVD |
|---|---|---|---|---|---|
| 35.90 mm | 0.50 mm | 10.79 mm | 10.77 mm | 49.46 mm | 141.60 |
| 54.93 | 9.65 | 7.07 | 5.34 | 53.89 | 147.03 |
| 85.00 | 17.79 | 2.84 | 1.43 | 57.80 | 150.94 |
| 101.42 | 20.76 | 0.60 | 0.70 | 58.53 | 151.67 |

TABLE V

| LENS | | SURFACE RADII(mm) | AXIAL DISTANCE BETWEEN SURFACES(mm) | $N_D$ | $V_D$ |
|---|---|---|---|---|---|
| L1 | S1 | 87.132 | 2.500 | 1.805 | 25.5 |
| | S2 | 50.967 | 10.500 | 1.517 | 64.2 |
| L2 | S3 | −218.779 | 0.100 | | |
| L3 | S4 | 38.314 | 4.000 | 1.618 | 55.2 |
| | S5 | 56.924 | Z1 | | |
| L4 | S6 | 117.702 | 1.400 | 1.834 | 37.3 |
| | S7 | 17.798 | 4.702 | | |
| L5 | S8 | −50.677 | 1.300 | 1.589 | 61.3 |
| | S9 | 49.929 | 0.100 | | |
| L6 | S10 | 27.135 | 6.500 | 1.699 | 30.1 |
| | S11 | −18.768 | 1.200 | 1.773 | 49.6 |
| L7 | S12 | 65.374 | Z2 | | |
| | | Aperture | 1.700 | — | — |
| L8 | S13 | 46.163 | 4.600 | 1.697 | 48.5 |
| | S14 | −61.782 | 0.950 | | |
| L9 | S15 | −31.839 | 1.600 | 1.847 | 37.3 |
| | S16 | −87.982 | Z3 | | |
| L10 | S17 | 2658.419 | 3.500 | 1.806 | 40.7 |
| | S18 | −45.955 | 0.100 | | |
| L11 | S19 | 55.327 | 5.400 | 1.487 | 70.4 |
| L12 | S20 | −30.009 | 1.300 | 1.805 | 25.5 |
| | S21 | −166.729 | 10.527 | | |
| L13 | S22 | 93.945 | 1.600 | 1.834 | 37.3 |
| | S23 | 37.521 | 1.956 | | |
| L14 | S24 | 157.252 | 3.500 | 1.786 | 43.9 |
| | S25 | −74.928 | | | |

ZOOM SPACING DATA

| EFL | Z1 | Z2 | Z3 | BFL | FVD |
|---|---|---|---|---|---|
| 28.88 mm | 1.75 mm | 20.26 mm | 16.96 mm | 50.66 mm | 174.73 mm |
| 50.00 | 14.87 | 12.47 | 11.62 | 63.63 | 177.70 |
| 105.00 | 29.25 | 5.24 | 4.47 | 83.17 | 197.24 |
| 154.41 | 36.29 | 1.87 | 0.80 | 90.30 | 204.37 |

TABLE VI

AXIAL DISTANCE

TABLE VI-continued

| LENS | | SURFACE RADII(mm) | BETWEEN SURFACES(mm) | $N_d$ | $V_d$ |
|---|---|---|---|---|---|
| L1 | S1 | 155.350 | 2.200 | 1.805 | 25.5 |
| | S2 | 62.701 | | | |
| L2 | | | 9.300 | 1.517 | 64.2 |
| | S3 | −159.115 | 0.100 | | |
| L3 | S4 | 47.500 | 3.500 | 1.723 | 38.0 |
| | S5 | 73.500 | Z1 | | |
| L4 | S6 | 151.230 | 1.504 | 1.834 | 37.3 |
| | S7 | 20.622 | 5.415 | | |
| L5 | S8 | −38.920 | 1.400 | 1.598 | 61.3 |
| | S9 | 94.000 | 0.100 | | |
| L6 | S10 | 37.400 | 7.700 | 1.699 | 30.1 |
| L7 | S11 | −19.236 | 1.100 | 1.773 | 49.6 |
| | S12 | 215.750 | Z2 | | |
| | Aperture | | 1.500 | | |
| L8 | S13 | 109.780 | 3.300 | 1.743 | 49.2 |
| | S14 | −144.100 | 0.100 | | |
| L9 | S15 | 71.820 | 5.800 | 1.589 | 61.3 |
| | S16 | −37.400 | | | |
| L10 | S17 | −2090.000 | 1.500 | 1.834 | 37.3 |
| | | | Z3 | | |
| L11 | S18 | 102.599 | 3.800 | 1.744 | 44.9 |
| | S19 | −110.900 | 0.100 | | |
| L12 | S20 | 57.000 | 5.500 | 1.487 | 70.4 |
| | S21 | −49.500 | | | |
| L13 | S22 | −350.000 | 1.500 | 1.805 | 25.5 |
| | | | 10.306 | | |
| L14 | S23 | 288.000 | 1.800 | 1.834 | 37.3 |
| | S24 | 35.570 | 1.663 | | |
| L15 | S25 | 129.810 | 3.200 | 1.834 | 37.3 |
| | S26 | −95.800 | | | |

ZOOM SPACING DATA

| EFL | Z1 | Z2 | Z3 | BFL | FVD |
|---|---|---|---|---|---|
| 39.50 mm | 8.97 mm | 23.72 mm | 24.87 mm | 55.41 mm | 187.60 mm |
| 70.08 | 26.06 | 14.23 | 14.13 | 70.87 | 199.93 |
| 137.21 | 42.17 | 5.56 | 4.60 | 90.13 | 217.10 |
| 193.26 | 49.82 | 0.95 | 0.94 | 97.09 | 223.94 |

TABLE VII

| LENS | | SURFACE RADII(mm) | AXIAL DISTANCE BETWEEN SURFACES(mm) | $N_d$ | $V_d$ |
|---|---|---|---|---|---|
| L1 | S1 | 243.578 | 2.200 | 1.805 | 25.5 |
| | S2 | 58.863 | | | |
| L2 | | | 8.500 | 1.517 | 64.2 |
| | S3 | −121.610 | 0.100 | | |
| L3 | S4 | 44.309 | 4.600 | 1.664 | 35.9 |
| | S5 | 99.626 | Z1 | | |
| L4 | S6 | 92.673 | 1.400 | 1.834 | 37.3 |
| | S7 | 17.808 | 5.358 | | |
| L5 | S8 | −36.818 | 1.400 | 1.517 | 64.2 |
| | S9 | 56.813 | 0.100 | | |
| L6 | S10 | 27.885 | 6.800 | 1.699 | 30.1 |
| L7 | S11 | −17.481 | 1.100 | 1.773 | 49.6 |
| | S12 | 61.149 | Z2 | | |
| | Aperture | | 1.500 | | |
| L8 | S13 | 46.648 | 4.100 | 1.603 | 60.7 |
| | S14 | −56.897 | 0.900 | | |
| L9 | S15 | −31.060 | 1.500 | 1.834 | 37.3 |
| | S16 | −56.434 | Z3 | | |
| L10 | S17 | 184.516 | 3.800 | 1.664 | 35.9 |
| | S18 | −52.262 | 0.100 | | |
| L11 | S19 | 52.773 | 5.500 | 1.487 | 70.4 |
| L12 | S20 | −32.229 | 1.500 | 1.805 | 25.5 |
| | S21 | −157.768 | 9.691 | | |
| L13 | S22 | 200.032 | 1.800 | 1.834 | 37.3 |
| | S23 | 37.027 | 1.692 | | |
| L14 | S24 | 141.797 | 3.200 | 1.743 | 49.2 |
| | S25 | −67.446 | | | |

ZOOM SPACING DATA

| EFL | Z1 | Z2 | Z3 | BFL | FVD |
|---|---|---|---|---|---|
| 28.88 mm | 1.00 mm | 22.71 mm | 19.79 mm | 55.01 mm | 167.60 mm |
| 66.52 | 21.03 | 11.57 | 10.90 | 79.41 | 192.00 |
| 135.00 | 34.22 | 5.16 | 4.12 | 104.19 | 216.77 |
| 193.00 | 40.61 | 1.95 | 0.94 | 115.22 | 227.80 |

TABLE VIII

| LENS | | SURFACE RADII(mm) | AXIAL DISTANCE BETWEEN SURFACES(mm) | $N_d$ | $V_d$ |
|---|---|---|---|---|---|
| L1 | S1 | −781.242 | 2.500 | 1.805 | 25.5 |
| | S2 | 156.226 | 0.105 | | |
| L2 | S3 | 75.329 | 7.473 | 1.487 | 70.4 |
| | S4 | −728.237 | 0.110 | | |
| L3 | S5 | 58.221 | 8.716 | 1.491 | 57.2 |
| | S6 | −1188.187 | Z1 | | |
| L4 | S7 | 64.040 | 1.600 | 1.834 | 37.3 |
| | S8 | 18.666 | 5.066 | | |
| L5 | S9 | −63.869 | 2.000 | 1.815 | 65.2 |
| | S10 | 18.672 | | | |
| L6 | S11 | 56.132 | 3.537 | 1.805 | 25.5 |
| | | | Z2 | | |
| | Aperture | | 0.800 | | |
| L7 | S12 | 40.929 | 2.500 | 1.564 | 60.8 |
| | S13 | −356.168 | 1.575 | | |

TABLE VIII-continued

| LENS | | SURFACE RADII(mm) | AXIAL DISTANCE BETWEEN SURFACES(mm) | $N_d$ | $V_d$ |
|---|---|---|---|---|---|
| L8 | S14 | −22.864 | | | |
|  | S15 | −47.470 | 1.500 | 1.517 | 52.2 |
|  |  |  | Z3 |  |  |
| L9 | S16 | 36.349 | 7.011 | 1.640 | 60.2 |
|  | S17 | −106.713 |  |  |  |
|  |  |  | 0.100 |  |  |
| L10 | S18 | 24.204 | 6.572 | 1.678 | 55.5 |
|  | S19 | 165.775 |  |  |  |
| L11 |  |  | 1.600 | 1.805 | 25.5 |
|  | S20 | 20.436 |  |  |  |
|  |  |  | 3.220 |  |  |
| L12 | S21 | 48.161 | 2.924 | 1.491 | 57.2 |
|  | S22 | −528.121 |  |  |  |

Surface S5 and S22 are aspheric

| S5 | | S22 | |
|---|---|---|---|
| K = −1.000 | D | $.2551 \times 10^{-04}$ | |
|  | E | $.3653 \times 10^{-07}$ | |
|  | F | $.2158 \times 10^{-11}$ | |
|  | G | $.5188 \times 10^{-12}$ | |

ZOOM SPACING DATA

| EFL | Z1 | Z2 | Z3 | BFL | FVD |
|---|---|---|---|---|---|
| 28.50 mm | 0.71 mm | 14.95 mm | 18.93 mm | 40.12 mm | 136.62 |
| 50.00 | 16.49 | 7.08 | 11.02 | 48.58 | 145.08 |
| 102.00 | 33.46 | 0.83 | 0.30 | 60.60 | 157.10 |

TABLE IX

| LENS | | SURFACE RADII(mm) | AXIAL DISTANCE BETWEEN SURFACES(mm) | $N_d$ | $V_d$ |
|---|---|---|---|---|---|
| L1 | S1 | 195.772 | 2.500 | 1.805 | 25.5 |
|  | S2 | 67.344 |  |  |  |
|  |  |  | 0.500 |  |  |
| L2 | S3 | 66.244 | 7.000 | 1.613 | 54.6 |
|  | S4 | −411.314 |  |  |  |
|  |  |  | 0.100 |  |  |
| L3 | S5 | 46.824 | 4.000 | 1.834 | 42.4 |
|  | S6 | 66.472 |  |  |  |
|  |  |  | Z1 |  |  |
| L4 | S7 | 100.775 | 1.600 | 1.834 | 37.3 |
|  | S8 | 21.211 |  |  |  |
|  |  |  | 5.851 |  |  |
| L5 | S9 | −153.496 | 2.000 | 1.481 | 69.6 |
|  | S10 | 19.263 |  |  |  |
| L6 |  |  | 3.537 | 1.824 | 24.6 |
|  | S11 | 45.706 |  |  |  |
|  |  |  | Z2 |  |  |
|  | Aperture |  | 0.800 |  |  |
| L7 | S12 | 42.808 | 2.500 | 1.581 | 59.3 |
|  | S13 | −8183.436 |  |  |  |
|  |  |  | 1.575 |  |  |
| L8 | S14 | −24.474 | 1.500 | 1.776 | 40.0 |
|  | S15 | −37.379 |  |  |  |
|  |  |  | Z3 |  |  |
| L9 | S16 | 35.468 | 5.400 | 1.663 | 57.9 |
|  | S17 | −104.707 |  |  |  |
|  |  |  | 0.100 |  |  |
| L10 | S18 | 26.104 | 4.800 | 1.692 | 54.4 |
|  | S19 | 238.734 |  |  |  |
| L11 |  |  | 1.600 | 1.805 | 25.5 |
|  | S20 | 23.704 |  |  |  |
|  |  |  | 5.602 |  |  |
| L12 | S21 | −402.429 | 2.924 | 1.491 | 57.2 |

TABLE IX-continued

| LENS | | SURFACE RADII(mm) | AXIAL DISTANCE BETWEEN SURFACES(mm) | $N_d$ | $V_d$ |
|---|---|---|---|---|---|
|  | S22 | −402.429 |  |  |  |
|  |  |  | 0.200 |  |  |
| L13 | S23 | 107.084 | 3.000 | 1.482 | 55.9 |
|  | S24 | −405.409 |  |  |  |

Aspheric Surface S22

| D | $.2455 \times 10^{-04}$ |
| E | $.5226 \times 10^{-07}$ |
| F | $-.6774 \times 10^{-10}$ |
| G | $.3605 \times 10^{-12}$ |

ZOOM SPACING DATA

| EFL | Z1 | Z2 | Z3 | BFL | FVD |
|---|---|---|---|---|---|
| 28.51 mm | 0.71 mm | 20.48 mm | 18.70 mm | 38.51 mm | 139.51 mm |
| 50.00 | 18.89 | 9.95 | 11.04 | 46.17 | 147.17 |
| 75.03 | 30.18 | 4.82 | 4.89 | 52.33 | 153.33 |
| 102.04 | 38.16 | 1.22 | 0.50 | 56.72 | 157.72 |

TABLE X

| LENS | | SURFACE RADII(mm) | AXIAL DISTANCE BETWEEN SURFACES(mm) | $N_d$ | $V_d$ |
|---|---|---|---|---|---|
| L1 | S1 | 122.608 | 2.500 | 1.805 | 25.5 |
|  | S2 | 55.746 |  |  |  |
|  |  |  | 0.500 |  |  |
| L2 | S3 | 54.539 | 10.600 | 1.517 | 64.2 |
|  | S4 | −249.144 |  |  |  |
|  |  |  | 0.100 |  |  |
| L3 | S5 | 41.949 | 4.328 | 1.702 | 41.2 |
|  | S6 | 75.883 |  |  |  |
|  |  |  | Z1 |  |  |
| L4 | S7 | 84.733 | 1.500 | 1.834 | 37.3 |
|  | S8 | 17.252 |  |  |  |
|  |  |  | 5.757 |  |  |
| L5 | S9 | −52.546 | 1.300 | 1.773 | 49.6 |
|  | S10 | 45.963 |  |  |  |
|  |  |  | 0.200 |  |  |
| L6 | S11 | 29.582 | 6.738 | 1.673 | 32.2 |
|  | S12 | −17.554 |  |  |  |
| L7 |  |  | 1.200 | 1.773 | 49.6 |
|  | S13 | −532.786 |  |  |  |
|  |  |  | Z2 |  |  |
|  | Aperture |  | 1.000 |  |  |
| L8 | S14 | 77.815 | 2.452 | 1.834 | 37.3 |
|  | S15 | −58.953 |  |  |  |
|  |  |  | 0.550 |  |  |
| L9 | S16 | −34.685 | 1.300 | 1.717 | 29.5 |
|  | S17 | −70.992 |  |  |  |
|  |  |  | Z3 |  |  |
| L10 | S18 | 33.486 | 4.446 | 1.720 | 50.3 |
|  | S19 | −174.911 |  |  |  |
|  |  |  | 0.100 |  |  |
| L11 | S20 | 37.651 | 5.299 | 1.717 | 48.0 |
|  | S21 | −55.577 |  |  |  |
| L12 | S22 | 23.790 | 2.000 | 1.785 | 26.1 |
|  |  |  | 5.147 |  |  |
|  | S23 | −32.331 |  |  |  |
| L13 |  |  | 2.300 | 1.491 | 57.2 |
|  | S24 | −110.442 |  |  |  |
|  |  |  | 0.200 |  |  |
|  | S25 | 150.096 |  |  |  |
| L14 |  |  | 6.350 | 1.487 | 70.4 |
|  | S26 | −31.538 |  |  |  |

Aspheric Surface S24

| D | $.1995 \times 10^{-04}$ |

TABLE X-continued

| | | |
|---|---|---|
| E | | $.5118 \times 10^{-07}$ |
| F | | $-.1442 \times 10^{-09}$ |
| G | | $.2947 \times 10^{-12}$ |

ZOOM SPACING DATA

| EFL | Z1 | Z2 | Z3 | BLF | FVD |
|---|---|---|---|---|---|
| 28.60 mm | 1.50 mm | 15.87 mm | 17.87 mm | 41.80 mm | 144.94 mm |
| 50.00 | 17.14 | 8.62 | 9.48 | 50.91 | 153.87 |
| 75.00 | 26.79 | 4.36 | 4.09 | 56.92 | 159.89 |
| 102.00 | 33.36 | 1.00 | 0.88 | 60.76 | 163.76 |

Table XI sets forth the powers K1–K4 of each lens lens unit G1–G4, respectively, as a function of the geometric mean $K_M$ of the extremes of the equivalent focal length of each lens where
$K_M = \sqrt{K_S K_L}$,
and
$K_S$ = the optical power of the lens at its shortest equivalent focal length, and
$K_L$ = the optical power of the lens at its longest equivalent focal length.

The optical powers are the reciprocal of the equivalent focal lengths in millimeters.

TABLE XI

| TABLE | $K_1/K_M$ | $K_2/K_M$ | $K_3/K_M$ | $K_4/K_M$ | $K_M$ |
|---|---|---|---|---|---|
| II | .778 | −3.660 | .858 | 1.173 | .0162 |
| III | .940 | −4.817 | 1.278 | 1.417 | .0115 |
| IV | .093 | −3.754 | .833 | 1.513 | .0167 |
| V | .773 | −3.860 | .687 | 1.780 | .0150 |
| VI | .833 | −4.193 | 1.263 | 1.289 | .0114 |
| VII | .851 | −4.320 | .880 | 1.433 | .0134 |
| VIII | .530 | −2.156 | .227 | 1.584 | .0185 |
| IX | .975 | −4.000 | .895 | 1.657 | .0162 |
| X | .627 | −2.941 | .778 | 1.162 | .0185 |

Table XII sets forth the equivalent focal lengths F4 of the fourth lens units G4 of the lenses, the front vertex distance $FVD_4$ of the fourth lens units and the telephoto ratios $TR_4$ of the fourth lens units.

TABLE XII

| TABLE | $F_4$ | $FVD_4$ | $TR_4$ |
|---|---|---|---|
| II | 44.35 mm | 54.07 mm | 1.219 |
| III | 61.39 | 71.47 | 1.164 |
| IV | 44.03 | 51.67 | 1.174 |
| V | 44.98 | 54.09 | 1.202 |
| VI | 68.21 | 72.36 | 1.061 |
| VII | 51.95 | 59.34 | 1.142 |
| VIII | 34.14 | 40.45 | 1.185 |
| IX | 36.75 | 42.48 | 1.156 |
| X | 46.58 | 46.58 | 1.162 |

From the foregoing tables it may be seen that $5.0 > |K_2/K_m| > 2.0$ $1.8 > K_4/K_m > 1.1$ $1.5 > TR_4 > 1.0$ These parameters provide well corrected lenses of various ranges of equivalent focal lengths having a fourth lens unit which contributes to the compactness of the overall lens.

Having thus described the invention, what is claimed is:

1. In a lens having a range of equivalent focal lengths from a dimension below the diagonal of the image frame of the lens to a dimension at least substantially three times the shortest equivalent focal length where said lens comprises a first positive lens unit, a second negative lens unit, a third positive lens unit, and a fourth positive lens unit, said lens having an aperture defining means in fixed relation to said third lens unit, said first and fourth lens units being axially movable in the same direction and at least one of said second and third lens units being axially movable to vary the equivalent focal length of said lens, said second lens unit having an absolute optical power at least 2.0 as great as the geometrical mean of the extremes of the equivalent focal lengths of said lens; and $1.8 > K_4/K_M > 1.0$ $1.5 > TR_4 > 1.0$ where $K_4$ is the optical power of said fourth lens unit, $K_M$ is the geometrical mean of the extremes of the equivalent focal lengths of said lens, and $TR_4$ is the telephoto ratio of said fourth lens unit, said fourth lens unit comprising first and second sub lens units, said first sub lens unit comprising from the object end a first positive element and a doublet formed of a positive element and a following negative element, said second sub lens unit comprising a positive element most closely adjacent the image plane.

2. The lens of claim 1 where said first and fourth lens units move in fixed relation to vary the equivalent focal length of said lens.

3. The lens of claim 1 where said doublet is in the form of a meniscus.

4. The lens of claim 1 where the elements of said doublet are air spaced.

5. The lens of claim 1 where said doublet is biconvex.

6. A zoom lens as described in claim 1 scaled to an image frame of 24×36 mm described substantially as follows:

| LENS | SURFACE | SURFACE RADII(mm) | AXIAL DISTANCE BETWEEN SURFACES(mm) | $N_d$ | $V_d$ |
|---|---|---|---|---|---|
| L1 | S1 | 160.690 | | | |
| | | | 2.500 | 1.805 | 25.5 |
| | S2 | 56.190 | | | |
| L2 | | | 10.270 | 1.517 | 64.2 |
| | S3 | −144.312 | | | |
| | | | 0.200 | | |
| | S4 | 40.250 | | | |
| L3 | | | 4.100 | 1.806 | 40.7 |
| | S5 | 69.987 | | | |
| | | | Z1 | | |
| | S6 | 61.000 | | | |
| L4 | | | 1.500 | 1.806 | 40.7 |
| | S7 | 15.180 | | | |
| | | | 5.180 | | |
| | S8 | −40.000 | | | |
| L5 | | | 1.400 | 1.773 | 49.6 |
| | S9 | 49.500 | | | |
| | | | 0.200 | | |
| | S10 | 28.000 | | | |
| L6 | | | 7.200 | 1.673 | 32.2 |
| | S11 | −15.415 | | | |
| L7 | | | 1.200 | 1.773 | 49.6 |
| | S12 | −619.000 | | | |
| | | | Z2 | | |
| | Aperture | | | | |
| | | | 1.500 | | |
| | S13 | 63.588 | | | |
| L8 | | | 3.530 | 1.697 | 48.5 |
| | S14 | −42.087 | | | |
| | | | 0.480 | | |
| | S15 | −30.682 | | | |
| L9 | | | 1.650 | 1.806 | 40.7 |
| | S16 | −64.500 | | | |

-continued

| LENS | | SURFACE RADII | AXIAL DISTANCE BETWEEN SURFACES | $N_d$ | $V_d$ |
|---|---|---|---|---|---|
| L10 | S17 | 34.420 | | | |
| | | | 4.630 | 1.581 | 40.9 |
| | S18 | −156.800 | | | |
| | | | 0.200 | | |
| L11 | S19 | 114.940 | | | |
| | | | 9.390 | 1.517 | 52.2 |
| | S20 | −31.690 | | | |
| L12 | | | 1.220 | 1.805 | 25.5 |
| | S21 | 34.420 | | | |
| | | | 2.480 | | |
| L13 | S22 | −88.000 | | | |
| | | | 2.400 | 1.806 | 40.7 |
| | S23 | −38.900 | | | |
| | | | 0.200 | | |
| L14 | S24 | 104.500 | | | |
| | | | 2.860 | 1.806 | 40.7 |
| | S25 | −140.000 | | | |

ZOOM SPACING DATA

| EFL | Z1 | Z2 | Z3 | BFL | FVD |
|---|---|---|---|---|---|
| 28.83 mm | 1.00 mm | 19.33 mm | 16.61 mm | 56.93 mm | 158.16 mm |
| 50.01 | 14.92 | 11.77 | 10.25 | 68.19 | 169.41 |
| 5.01 | 26.31 | 6.24 | 4.38 | 78.01 | 179.24 |
| 131.00 | 34.52 | 1.51 | 0.91 | 83.26 | 184.48 | where L1–L14 are lens elements progressively from the object to the image end, S1–S25 are the lens surfaces from the object to image end, $N_D$ is the index of refraction of each lens element, and $V_D$ is the dispersion of each lens element as measured by its Abbe number.

7. A zoom lens as described in claim 1 scaled to an image frame of 24×36 mm described substantially as follows:

| LENS | | SURFACE RADII(mm) | AXIAL DISTANCE BETWEEN SURFACES(mm) | $N_d$ | $V_d$ |
|---|---|---|---|---|---|
| L1 | S1 | 102.879 | | | |
| | | | 2.300 | 1.741 | 27.8 |
| | S2 | 48.694 | | | |
| | | | 0.500 | | |
| L2 | S3 | 48.183 | | | |
| | | | 10.400 | 1.514 | 64.2 |
| | S4 | −189.534 | | | |
| | | | 0.100 | | |
| L3 | S5 | 43.872 | | | |
| | | | 4.000 | 1.541 | 47.2 |
| | S6 | 75.339 | | | |
| | | | Z1 | | |
| L4 | S7 | 84.254 | | | |
| | | | 1.660 | 1.834 | 37.3 |
| | S8 | 20.443 | | | |
| | | | 5.908 | | |
| L5 | S9 | −32.836 | | | |
| | | | 1.440 | 1.773 | 49.6 |
| | S10 | 57.306 | | | |
| | | | 0.220 | | |
| L6 | S11 | 43.367 | | | |
| | | | 7.200 | 1.717 | 29.5 |
| | S12 | −16.903 | | | |
| L7 | | | 1.330 | 1.773 | 49.6 |
| | S13 | −333.557 | | | |
| | | | Z2 | | |
| L8 | S14 | 64.932 | | | |
| | | | 5.000 | 1.604 | 60.2 |
| | S15 | −48.454 | | | |
| | | | 1.126 | | |
| L9 | S16 | −29.934 | | | |
| | | | 2.000 | 1.673 | 32.2 |
| | S17 | −47.916 | | | |
| | | | 0.500 | | |
| | Aperture | | | | |
| | | | Z3 | | |
| L10 | S18 | 125.580 | | | |
| | | | 3.670 | 1.648 | 33.8 |
| | S19 | −68.714 | | | |
| | | | 0.180 | | |
| L11 | S20 | 88.886 | | | |
| | | | 6.000 | 1.517 | 64.2 |
| | S21 | −32.051 | | | |
| L12 | | | 5.500 | 1.785 | 25.7 |
| | S22 | −83.481 | | | |
| | | | 8.017 | | |
| L13 | S23 | 118.446 | | | |
| | | | 6.000 | 1.581 | 40.9 |
| | S24 | −42.226 | | | |
| L14 | | | 2.000 | 1.717 | 29.5 |
| | S25 | 37.606 | | | |
| | | | 1.900 | | |
| | S26 | 341.397 | | | |
| L15 | | | 4.800 | 1.805 | 25.5 |
| | S27 | −95.200 | | | |

ZOOM SPACING DATA

| EFL | Z1 | Z2 | Z3 | BFL | FVD |
|---|---|---|---|---|---|
| 38.50 mm | 7.00 mm | 19.19 mm | 23.74 mm | 48.36 mm | 186.24 mm |
| 73.00 | 22.36 | 10.63 | 13.68 | 66.89 | 201.50 |
| 136.00 | 36.30 | 4.64 | 5.02 | 81.83 | 215.74 |
| 194.06 | 42.86 | 0.59 | 1.06 | 89.52 | 221.97 | where L1–L15 are lens elements progressively from the object to the image end, S1–S27 are the lens surfaces from the object to image end, $N_D$ is the index of refraction of each lens element, and $V_D$ is the dispersion of each lens element as measured by its Abbe number.

8. A zoom lens as described in claim 1 scaled to an image frame of 24×36 mm described substantially as follows:

| LENS | | SURFACE RADII(mm) | AXIAL DISTANCE BETWEEN SURFACES(mm) | $N_d$ | $V_D$ |
|---|---|---|---|---|---|
| L1 | S1 | 97.471 | | | |
| | | | 2.000 | 1.805 | 25.5 |
| | S2 | 46.414 | | | |
| | | | 0.961 | — | — |
| | S3 | 44.857 | | | |
| L2 | | | 7.500 | 1.517 | 64.2 |
| | S4 | −204.325 | | | |
| | | | 0.100 | | |
| | S5 | 33.332 | | | |
| L3 | | | 5.000 | 1.658 | 50.9 |
| | S6 | 67.053 | | | |
| | | | Z1 | | |
| | S7 | 48.154 | | | |
| L4 | | | 1.400 | 1.834 | 37.3 |
| | S8 | 16.552 | | | |
| | | | 9.047 | | |
| | S9 | −29.301 | | | |
| L5 | | | 1.200 | 1.773 | 49.6 |
| | S10 | 37.735 | | | |
| | | | 0.200 | | |
| | S11 | 30.244 | | | |
| L6 | | | 5.800 | 1.673 | 32.2 |
| | S12 | −13.650 | | | |
| L7 | | | 1.200 | 1.773 | 49.6 |
| | S13 | −101.590 | | | |
| | | | Z2 | | |
| | Aperture | | | | |
| | | | 1.040 | | |
| | S14 | 651.451 | | | |
| L8 | | | 2.500 | 1.834 | 37.3 |
| | S15 | −75.022 | | | |
| | | | Z3 | | |
| | S16 | 148.051 | | | |
| L9 | | | 2.664 | 1.834 | 37.3 |
| | S17 | −59.655 | | | |
| | | | 0.100 | | |
| | S18 | 17.272 | | | |
| L10 | | | 3.600 | 1.517 | 64.2 |
| | S19 | 80.238 | | | |
| | | | 0.570 | | |
| | S20 | −2295.605 | | | |

-continued-

| LENS | | SURFACE RADII(mm) | AXIAL DISTANCE BETWEEN SURFACES(mm) | $N_D$ | $V_D$ |
|---|---|---|---|---|---|
| L11 | | | 6.060 | 1.785 | 26.1 |
| | S21 | 17.700 | | | |
| | | | 6.307 | | |
| | S22 | 47.296 | | | |
| L12 | | | 2.000 | 1.805 | 25.5 |
| | S23 | 28.126 | | | |
| | | | 0.931 | | |
| | S24 | 29.714 | | | |
| L13 | | | 6.000 | 1.517 | 64.2 |
| | S25 | −40.167 | | | |

ZOOM SPACING DATA

| EFL | Z1 | Z2 | Z3 | BFL | FVD |
|---|---|---|---|---|---|
| 35.90 mm | 0.50 mm | 10.79 mm | 10.77 mm | 49.46 mm | 141.60 |
| 54.93 | 9.65 | 7.07 | 5.34 | 53.89 | 147.03 |
| 85.00 | 17.79 | 2.84 | 1.43 | 57.80 | 150.94 |
| 101.42 | 20.76 | 0.60 | 0.70 | 58.53 | 151.67 | where L1–L13 are lens elements progressively from the object to the image end, S1–S25 are the lens surfaces from the object to image end, $N_D$ is the index of refraction of each lens element, and $V_D$ is the dispersion of each lens element as measured by its Abbe number.

9. A zoom lens as described in claim 1 scaled to an image frame of 24×36 mm described substantially as follows:

| LENS | | SURFACE RADII(mm) | AXIAL DISTANCE BETWEEN SURFACES(mm) | $N_D$ | $V_D$ |
|---|---|---|---|---|---|
| L1 | S1 | 87.132 | 2.500 | 1.805 | 25.5 |
| L2 | S2 | 50.967 | 10.500 | 1.517 | 64.2 |
| | S3 | −218.779 | 0.100 | | |
| L3 | S4 | 38.314 | 4.000 | 1.618 | 55.2 |
| | S5 | 56.924 | Z1 | | |
| L4 | S6 | 117.702 | 1.400 | 1.834 | 37.3 |
| | S7 | 17.798 | 4.702 | | |
| L5 | S8 | −50.677 | 1.300 | 1.589 | 61.3 |
| | S9 | 49.929 | 0.100 | | |
| L6 | S10 | 27.135 | 6.500 | 1.699 | 30.1 |
| L7 | S11 | −18.768 | 1.200 | 1.773 | 49.6 |
| | S12 | 65.374 | Z2 | | |
| | Aperture | | 1.700 | | |
| L8 | S13 | 46.163 | 4.600 | 1.697 | 48.5 |
| | S14 | −61.782 | 0.950 | | |
| L9 | S15 | −31.839 | 1.600 | 1.847 | 37.3 |
| | S16 | −87.982 | Z3 | | |
| L10 | S17 | 2658.419 | 3.500 | 1.806 | 40.7 |
| | S18 | −45.955 | 0.100 | | |
| L11 | S19 | 55.327 | 5.400 | 1.487 | 70.4 |
| | S20 | −30.009 | | | |
| L12 | S21 | −166.729 | 1.300 | 1.805 | 25.5 |
| | S22 | 93.945 | 10.527 | | |
| L13 | | | 1.600 | 1.834 | 37.3 |

-continued-

| LENS | | SURFACE RADII(mm) | AXIAL DISTANCE BETWEEN SURFACES(mm) | $N_D$ | $V_D$ |
|---|---|---|---|---|---|
| | S23 | 37.521 | 1.956 | | |
| | S24 | 157.252 | | | |
| L14 | | | 3.500 | 1.786 | 43.9 |
| | S25 | −74.928 | | | |

ZOOM SPACING DATA

| EFL | Z1 | Z2 | Z3 | BFL | FVD |
|---|---|---|---|---|---|
| 28.88 mm | 1.75 mm | 20.26 mm | 16.96 mm | 50.66 mm | 174.73 mm |
| 50.00 | 14.87 | 12.47 | 11.62 | 63.63 | 177.70 |
| 105.00 | 29.25 | 5.24 | 4.47 | 83.17 | 197.24 |
| 154.41 | 36.29 | 1.87 | 0.80 | 90.30 | 204.37 | where L1–L14 are lens elements progressively from the object to the image end, S1–S25 are the lens surfaces from the object ot image end, $N_D$ is the index of refraction of each lens element, and $V_D$ is the dispersion of each lens element as measured by its Abbe number.

10. A zoom lens as described in claim 1 scaled to an image frame of 24×36 mm described substantially as follows:

| LENS | | SURFACE RADII(mm) | AXIAL DISTANCE BETWEEN SURFACES(mm) | $N_d$ | $V_d$ |
|---|---|---|---|---|---|
| L1 | S1 | 155.350 | 2.200 | 1.805 | 25.5 |
| L2 | S2 | 62.701 | 9.300 | 1.517 | 64.2 |
| | S3 | −159.115 | 0.100 | | |
| L3 | S4 | 47.500 | 3.500 | 1.723 | 38.0 |
| | S5 | 73.500 | Z1 | | |
| L4 | S6 | 151.230 | 1.504 | 1.834 | 37.3 |
| | S7 | 20.622 | 5.415 | | |
| L5 | S8 | −38.920 | 1.400 | 1.598 | 61.3 |
| | S9 | 94.000 | 0.100 | | |
| L6 | S10 | 37.400 | 7.700 | 1.699 | 30.1 |
| L7 | S11 | −19.236 | 1.100 | 1.773 | 49.6 |
| | S12 | 215.750 | Z2 | | |
| | Aperture | | 1.500 | | |
| L8 | S13 | 109.780 | 3.300 | 1.743 | 49.2 |
| | S14 | −144.100 | 0.100 | | |
| L9 | S15 | 71.820 | 5.800 | 1.589 | 61.3 |
| L10 | S16 | −37.400 | 1.500 | 1.834 | 37.3 |
| | S17 | −2090.000 | Z3 | | |
| L11 | S18 | 102.599 | 3.800 | 1.744 | 44.9 |
| | S19 | −110.900 | 0.100 | | |
| L12 | S20 | 57.000 | 5.500 | 1.487 | 70.4 |
| L13 | S21 | −49.500 | 1.500 | 1.805 | 25.5 |
| | S22 | −350.000 | 10.306 | | |
| L14 | S23 | 288.000 | 1.800 | 1.834 | 37.3 |
| | S24 | 35.570 | 1.663 | | |
| L15 | S25 | 129.810 | 3.200 | 1.834 | 37.3 |

-continued

| | S26 | −95.800 | | | |
|---|---|---|---|---|---|

ZOOM SPACING DATA

| EFL | Z1 | Z2 | Z3 | BFL | FVD |
|---|---|---|---|---|---|
| 39.50 mm | 8.97 mm | 23.72 mm | 24.87 mm | 55.41 mm | 187.60 mm |
| 70.08 | 26.06 | 14.23 | 14.13 | 70.87 | 199.93 |
| 137.21 | 42.17 | 5.56 | 4.60 | 90.13 | 217.10 |
| 193.26 | 49.82 | 0.95 | 0.94 | 97.09 | 223.94 | where L1–L15 are lens elements progressively from the object to the image end, S1–S26 are the lens surfaces from the object to image end, $N_D$ is the index of refraction of each lens element, and $V_D$ is the dispersion of each lens element as measured by its Abbe number.

11. A zoom lens as described in claim 1 scaled to an image frame of 24×36 mm described substantially as follows:

| LENS | SURFACE RADII(mm) | AXIAL DISTANCE BETWEEN SURFACES(mm) | $N_d$ | $V_d$ |
|---|---|---|---|---|
| L1 | S1  243.578 | 2.200 | 1.805 | 25.5 |
| L2 | S2   58.863 | 8.500 | 1.517 | 64.2 |
|    | S3  −121.610 | 0.100 | | |
| L3 | S4   44.309 | 4.600 | 1.664 | 35.9 |
|    | S5   99.626 | Z1 | | |
| L4 | S6   92.673 | 1.400 | 1.834 | 37.3 |
|    | S7   17.808 | 5.358 | | |
| L5 | S8  −36.818 | 1.400 | 1.517 | 64.2 |
|    | S9   56.813 | 0.100 | | |
| L6 | S10  27.885 | 6.800 | 1.699 | 30.1 |
|    | S11 −17.481 | | | |
| L7 | S12  61.149 | 1.100 | 1.773 | 49.6 |
|    |  | Z2 | | |
|    | Aperture | 1.500 | | |
| L8 | S13  46.648 | 4.100 | 1.603 | 60.7 |
|    | S14 −56.897 | 0.900 | | |
| L9 | S15 −31.060 | 1.500 | 1.834 | 37.3 |
|    | S16 −56.434 | Z3 | | |
| L10 | S17 184.516 | 3.800 | 1.664 | 35.9 |
|     | S18 −52.262 | 0.100 | | |
| L11 | S19  52.773 | 5.500 | 1.487 | 70.4 |
|     | S20 −32.229 | | | |
| L12 | S21 −157.768 | 1.500 | 1.805 | 25.5 |
|     |  | 9.691 | | |
| L13 | S22 200.032 | 1.800 | 1.834 | 37.3 |
|     | S23  37.027 | 1.692 | | |
| L14 | S24 141.797 | 3.200 | 1.743 | 49.2 |
|     | S25 −67.446 | | | |

ZOOM SPACING DATA

| EFL | Z1 | Z2 | Z3 | BFL | FVD |
|---|---|---|---|---|---|
| 28.88 mm | 1.00 mm | 22.71 mm | 19.79 mm | 55.01 mm | 167.60 mm |
| 66.52 | 21.03 | 11.57 | 10.90 | 79.41 | 192.00 |
| 135.00 | 34.22 | 5.16 | 4.12 | 104.19 | 216.77 |
| 193.00 | 40.61 | 1.95 | 0.94 | 115.22 | 227.80 | where L1–L14 are lens elements progressively from the object to the image end, S1–S25 are the lens surfaces from the object to image end, $N_D$ is the index of refraction of each lens element, and $V_D$ is the dispersion of each lens element as measured by its Abbe number.

12. A lens according to claim 1 having at least one aspheric surface defined by the equation $$X + \frac{CY}{1 + \sqrt{1 - (1 + k)C^2 Y^2}} + Dy^4 + Ey^6 + Fy^8 + Gy^{10}$$

where x is the surface sag at a semi-aperture distance Y from the axis A of the lens, C is the curvature of a lens surface of the optical axis A equal to the reciprocal of the radius of the optical axis, K is a conic constant.

13. A zoom lens as described in claim 12 scaled to an image frame of 24×36 mm described substantially as follows:

| LENS | SURFACE RADII(mm) | AXIAL DISTANCE BETWEEN SURFACES(mm) | $N_d$ | $V_d$ |
|---|---|---|---|---|
| L1 | S1 −781.242 | 2.500 | 1.805 | 25.5 |
|    | S2  156.226 | 0.105 | | |
| L2 | S3   75.329 | 7.473 | 1.487 | 70.4 |
|    | S4 −728.237 | 0.110 | | |
| L3 | S5   58.221 | 8.716 | 1.491 | 57.2 |
|    | S6 −1188.187 | Z1 | | |
| L4 | S7   64.040 | 1.600 | 1.834 | 37.3 |
|    | S8   18.666 | 5.066 | | |
| L5 | S9  −63.869 | 2.000 | 1.815 | 65.2 |
| L6 | S10  18.672 | 3.537 | 1.805 | 25.5 |
|    | S11  56.132 | Z2 | | |
|    | Aperture | 0.800 | | |
| L7 | S12  40.929 | 2.500 | 1.564 | 60.8 |
|    | S13 −356.168 | 1.575 | | |
| L8 | S14 −22.864 | 1.500 | 1.517 | 52.2 |
|    | S15 −47.470 | Z3 | | |
| L9 | S16  36.349 | 7.011 | 1.640 | 60.2 |
|    | S17 −106.713 | 0.100 | | |
| L10 | S18  24.204 | 6.572 | 1.678 | 55.5 |
| L11 | S19 165.775 | 1.600 | 1.805 | 25.5 |
|     | S20  20.436 | 3.220 | | |
| L12 | S21  48.161 | 2.924 | 1.491 | 57.2 |
|     | S22 −528.121 | | | |

Surface S5 and S22 are aspheric

| S5 | | S22 | |
|---|---|---|---|
| K = −1.000 | D | .2551 × 10$^{-04}$ | |

-continued-

| | | |
|---|---|---|
| E | .3653 × 10$^{-07}$ | |
| F | .2158 × 10$^{-11}$ | |
| G | .5188 × 10$^{-12}$ | |

ZOOM SPACING DATA

| EFL | Z1 | Z2 | Z3 | BFL | FVD |
|---|---|---|---|---|---|
| 28.50 mm | 0.71 mm | 14.95 mm | 18.93 mm | 40.12 mm | 136.62 |
| 50.00 | 16.49 | 7.08 | 11.02 | 48.58 | 145.08 |
| 102.00 | 33.46 | 0.83 | 0.30 | 60.60 | 157.10 | where L1–L12 are lens elements progressively from the object to the image end, S1–S22 are the lens surfaces from the object to image end, $N_D$ is the index of refraction of each lens element, and $V_D$ is the dispersion of each lens element as measured by its Abbe number.

14. A zoom lens as described in claim 12 scaled to an image frame of 24×36 mm described substantially as follows:

| LENS | | SURFACE RADII(mm) | AXIAL DISTANCE BETWEEN SURFACES(mm) | $N_d$ | $V_d$ |
|---|---|---|---|---|---|
| L1 | S1 | 195.772 | 2.500 | 1.805 | 25.5 |
| | S2 | 67.344 | 0.500 | | |
| L2 | S3 | 66.244 | 7.000 | 1.613 | 54.6 |
| | S4 | −411.314 | 0.100 | | |
| L3 | S5 | 46.824 | 4.000 | 1.834 | 42.4 |
| | S6 | 66.472 | Z1 | | |
| L4 | S7 | 100.775 | 1.600 | 1.834 | 37.3 |
| | S8 | 21.211 | 5.851 | | |
| L5 | S9 | −153.496 | 2.000 | 1.481 | 69.6 |
| | S10 | 19.263 | 3.537 | 1.824 | 24.6 |
| L6 | S11 | 45.706 | Z2 | | |
| | Aperture | | 0.800 | | |
| L7 | S12 | 42.808 | 2.500 | 1.581 | 59.3 |
| | S13 | −8183.436 | 1.575 | | |
| L8 | S14 | −24.474 | 1.500 | 1.776 | 40.0 |
| | S15 | −37.379 | Z3 | | |
| L9 | S16 | 35.468 | 5.400 | 1.663 | 57.9 |
| | S17 | −104.707 | 0.100 | | |
| L10 | S18 | 26.104 | 4.800 | 1.692 | 54.4 |
| L11 | S19 | 238.734 | 1.600 | 1.805 | 25.5 |
| | S20 | 23.704 | 5.602 | | |
| L12 | S21 | −402.429 | 2.924 | 1.491 | 57.2 |
| | S22 | −402.429 | 0.200 | | |
| L13 | S23 | 107.084 | 3.000 | 1.482 | 55.9 |
| | S24 | −405.409 | | | |

Aspheric Surface S22

| | |
|---|---|
| D | .2455 × 10$^{-04}$ |
| E | .5226 × 10$^{-07}$ |
| F | −.6774 × 10$^{-10}$ |
| G | .3605 × 10$^{-12}$ |

ZOOM SPACING DATA

| EFL | Z1 | Z2 | Z3 | BFL | FVD |
|---|---|---|---|---|---|
| 28.51 mm | 0.71 mm | 20.48 mm | 18.70 mm | 38.51 mm | 139.51 mm |
| 50.00 | 18.89 | 9.95 | 11.04 | 46.17 | 147.17 |
| 75.03 | 30.18 | 4.82 | 4.89 | 52.33 | 153.33 |
| 102.04 | 38.16 | 1.22 | 0.50 | 56.72 | 157.72 | where L1–L12 are lens elements progressively from the object to the image end, S1–S24 are the lens surfaces from the object to image end, $N_D$ is the index of refraction of each lens element, and $V_D$ is the dispersion of each lens element as measured by its Abbe number.

15. A zoom lens as described in claim 12 scaled to an image frame of 24×36 mm described substantially as follows:

| LENS | | SURFACE RADII(mm) | AXIAL DISTANCE BETWEEN SURFACES(mm) | $N_d$ | $V_d$ |
|---|---|---|---|---|---|
| L1 | S1 | 122.608 | 2.500 | 1.805 | 25.5 |
| | S2 | 55.746 | 0.500 | | |
| L2 | S3 | 54.539 | 10.600 | 1.517 | 64.2 |
| | S4 | −249.144 | 0.100 | | |
| L3 | S5 | 41.949 | 4.328 | 1.702 | 41.2 |
| | S6 | 75.883 | Z1 | | |
| L4 | S7 | 84.733 | 1.500 | 1.834 | 37.3 |
| | S8 | 17.252 | 5.757 | | |
| L5 | S9 | −52.546 | 1.300 | 1.773 | 49.6 |
| | S10 | 45.963 | 0.200 | | |
| L6 | S11 | 29.582 | 6.738 | 1.673 | 32.2 |
| | S12 | −17.554 | 1.200 | 1.773 | 49.6 |
| L7 | S13 | −532.786 | Z2 | | |
| | Aperture | | 1.000 | | |
| L8 | S14 | 77.815 | 2.452 | 1.834 | 37.3 |
| | S15 | −58.953 | 0.550 | | |
| | S16 | −34.685 | 1.300 | 1.717 | 29.5 |
| L9 | S17 | −70.992 | Z3 | | |
| L10 | S18 | 33.486 | 4.446 | 1.720 | 50.3 |
| | S19 | −174.911 | 0.100 | | |
| L11 | S20 | 37.651 | 5.299 | 1.717 | 48.0 |
| | S21 | −55.577 | 2.000 | 1.785 | 26.1 |
| L12 | S22 | 23.790 | 5.147 | | |
| L13 | S23 | −32.331 | 2.300 | 1.491 | 57.2 |
| | S24 | −110.442 | 0.200 | | |
| L14 | S25 | 150.096 | 6.350 | 1.487 | 70.4 |
| | S26 | −31.538 | | | |

Aspheric Surface S24

| | |
|---|---|
| D | .1995 × 10$^{-04}$ |
| E | .5118 × 10$^{-07}$ |
| F | −.1442 × 10$^{-09}$ |

-continued

| | G | .2947 × 10$^{-12}$ | | | |

ZOOM SPACING DATA

| EFL | Z1 | Z2 | Z3 | BLF | FVD |
|---|---|---|---|---|---|
| 28.60 mm | 1.50 mm | 15.87 mm | 17.87 mm | 41.80 mm | 144.94 mm |
| 50.00 | 17.14 | 8.62 | 9.48 | 50.91 | 153.87 |
| 75.00 | 26.79 | 4.36 | 4.09 | 56.92 | 159.89 |

-continued

| | | | | | |
|---|---|---|---|---|---|
| 102.00 | 33.36 | 1.00 | 0.88 | 60.76 | 163.76 | where L1–L14 are lens elements progressively from the object to the image end, S1–S26 are the lens surfaces from the object to the image end, $N_d$ is the index of refraction of each lens element, and $V_d$ is the dispersion of each lens element as measured by its Abbe number.

* * * * *